UNITED STATES PATENT OFFICE.

ALBERT AHLIN, OF ORREFORS, SWEDEN, ASSIGNOR TO ORREFORS BRUKS AKTIEBOLAG, OF ORREFORS, SWEDEN.

METHOD OF MANUFACTURING DECORATED ARTICLES OF GLASS WITH COLORED FIGURES IN THE GLASS MASS.

1,343,806.     Specification of Letters Patent.     Patented June 15, 1920.

No Drawing.     Application filed December 7, 1917. Serial No. 205,990.

*To all whom it may concern:*

Be it known that I, ALBERT AHLIN, engineer, a subject of the King of Sweden, residing at Orrefors, Sweden, have invented new and useful Improvements in Methods of Manufacturing Decorated Articles of Glass with Colored Figures in the Glass Mass, of which the following is a specification.

The present invention relates to the manufacture of decorated articles of glass having colored figures in the glass mass, and is characterized by fading transitions between the different colors.

The method heretofore known of manufacturing decorated articles of glass, in which glass painting or enamel has been applied on the surface of a glass sheet, which then has been slowly heated to receive a cover of a second glass layer, has suffered the inconvenience, that the appearance or outlines of the painted or enameled figures have changed during the heating and manipulation of the glass owing to the different points of melting of the glass and the paint or enamel.

Glass powder has been mixed with the paint or enamel in order to give the latter the same point of smelting as the glass, but this improvement has not been entirely successful and the above mentioned inaccuracy, at least in part, still remains.

When manufacturing decorated articles having colored figures, by etching, the etching heretofore has been carried out on a colored glass layer, which has been applied on a glass mass, whereby a figure in relief on an uncolored bottom has been obtained. Said figure however is characterized by sharp and hard outlines, which lack the fading transition of color, which would impart artistic value to the articles.

According to the present invention said inconveniences are avoided by establishing the figures by etching in a known manner by means of hydrofluoric acid on a colored glass layer which is heated and covered with an outer layer of uncolored glass. The figures will thereby consist of a glass mass, having exactly the same chemical composition as the surrounding glass, whereby they will expand uniformly with the surrounding glass when heated. The outlines will be mild and faded during the work, whereby an article of considerably higher artistic value than the articles manufactured according to hitherto known methods will be obtained.

Having now described my invention what I claim as new and desire to secure by Letters Patent is:

A method of manufacturing colored glass articles which consists in etching figures upon a colored glass layer, applying thereon an outer layer of uncolored glass and fusing the contiguous surfaces together, thereby filling up the etching.

In testimony whereof I have signed my name to this specification in the presence of two subscribing witnesses.

ALB. AHLIN.

Witnesses:
    WALDEMAR BOMAN,
    GRETA PRIEN.